United States Patent [19]
Johnson

[11] Patent Number: 5,114,202
[45] Date of Patent: May 19, 1992

[54] MULTIPURPOSE TRAILER

[76] Inventor: Richard D. Johnson, 42891 McKenzie Hwy., Leaburg, Oreg. 97489

[21] Appl. No.: 680,850

[22] Filed: Apr. 5, 1991

[51] Int. Cl.[5] .............................. B62D 33/08
[52] U.S. Cl. ...................... 296/26; 296/61; 410/4
[58] Field of Search ............. 296/26, 172, 175, 176, 296/61; 410/4, 29

[56] References Cited

U.S. PATENT DOCUMENTS

| | | | |
|---|---|---|---|
| 1,998,937 | 4/1935 | McGinnis | 296/76 X |
| 2,797,124 | 6/1957 | Hauptli | 296/26 |
| 2,821,428 | 1/1958 | Webster | 296/26 |
| 3,360,294 | 12/1967 | Cieslak | 296/27 |
| 3,694,024 | 9/1972 | Linville | 296/26 |
| 3,875,871 | 4/1975 | Thornton et al. | 410/29 X |
| 3,972,428 | 8/1976 | Love et al. | 296/61 X |
| 4,106,732 | 8/1978 | Whiting | 296/175 X |
| 4,294,484 | 10/1981 | Robertson | 296/176 X |
| 4,328,989 | 5/1982 | Childers | 296/27 |
| 4,392,682 | 7/1983 | Norkus | 296/26 |
| 4,488,752 | 12/1984 | Broussard | 296/172 X |
| 4,657,233 | 4/1987 | Vroom | 296/61 X |
| 4,738,575 | 4/1988 | Blodgett et al. | 410/29 |
| 4,789,281 | 12/1988 | Westerdale | 296/26 X |
| 4,887,860 | 12/1989 | Dowty | 296/26 |

FOREIGN PATENT DOCUMENTS

| | | | |
|---|---|---|---|
| 279471 | 11/1990 | Japan | 296/26 |
| 454886 | 10/1936 | United Kingdom | 296/61 |

Primary Examiner—Johnny D. Cherry
Assistant Examiner—Gary C. Hoge
Attorney, Agent, or Firm—James D. Givnan, Jr.

[57] ABSTRACT

A trailer is disclosed having a verticaly positionable roof to permit towing with minimum drag and buffeting. Electromechanical actuators position the roof. A rear wall is comprised of ramps which abut one another and brace the rear upright edges of the trailer sidewalls. A side door of the trailer permits entry and exit from an automobile parked in the trailer. A skirt portion of the roof additionally includes a door overlying the first-mentioned door to permit standard door height. Collapsible shelves within the trailer facilitate secondary use of the trailer when parked. The trailer ramps are spring biased to facilitate their positioning.

2 Claims, 1 Drawing Sheet

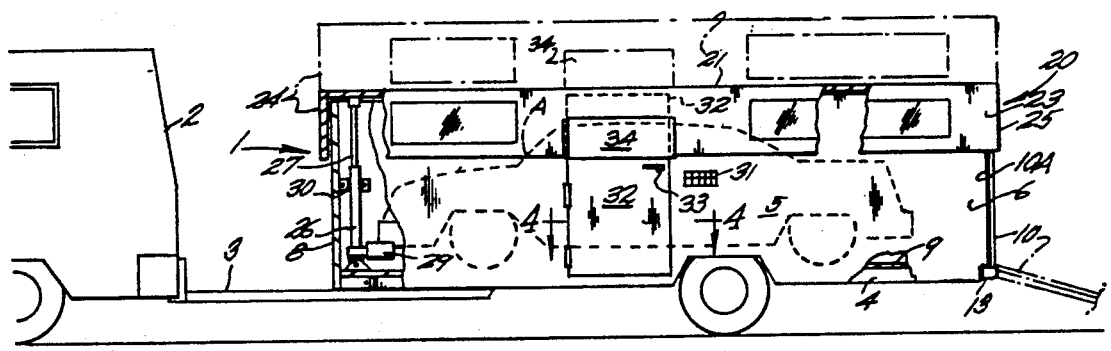
Fig. 1
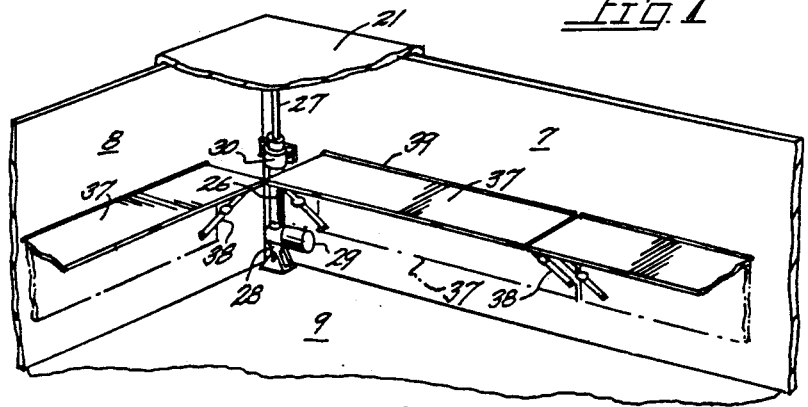
Fig. 2
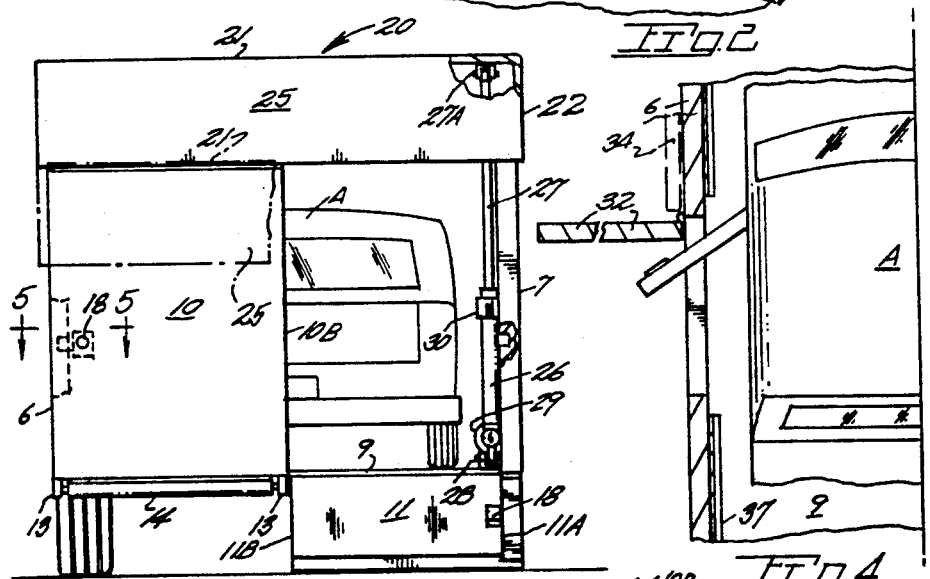
Fig. 3
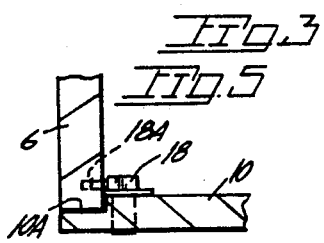
Fig. 5
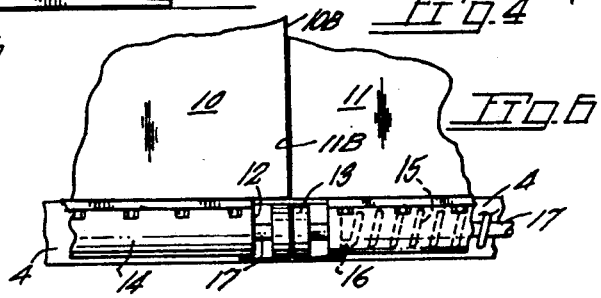
Fig. 4
Fig. 6

MULTIPURPOSE TRAILER

BACKGROUND OF THE INVENTION

The present invention pertains generally to trailer construction and particularly to that type of construction providing a retractable roof to facilitate towing.

Owners of motor homes commonly tow a small automobile behind the motor home for use when the motor home is being used as a residence. The towed vehicle paint and glass is subject to damage as a result of being towed. Further, dollies are often used for supporting the automobile's front wheels with the rear wheels in road contact. Depending on the vehicle transmission drive train such a practice is limited to front wheel drive vehicles as damage could result from such towing to a vehicle having a rear wheel drive system. Still further, the dollies used for the towing of an automobile behind a motor home are of use only for that one purpose.

The wide use of motor homes for semipermanent residences is now commonplace with people utilizing their motor homes for several weeks or months at a time each year as a temporary residence. As space within a motor home is limited the owner is restricted in the various types of recreational gear or items he or she may take to the semipermanent location. For example, individuals utilizing motor homes as semipermanent residences often pursue hobbies such as carpentry or rock hounding which normally require a work shop. Without a auxiliary area the individual must forego usual hobbies or business endeavors in view of the lack of space.

The concept of a truck trailer with a vertically adjustable roof is not new as evidenced by U.S. Pat. No. 2,821,428 wherein a truck trailer includes a vertically adjustable upper portion and a double set of rearwardly opening doors. A second U.S. Pat. No. 4,789,281 discloses a truck trailer for auto transport having a vertically adjustable roof portion while U.S. Pat. Nos. 3,360,294 and 4,328,989 disclose roofs for pickup truck cargo beds which roofs may be vertically positioned. U.S. Pat. No. 2,797,124 discloses a truck trailer having an adjustable roof as does U.S. Pat. No. 4,887,860 which utilizes pneumatic jacks for raising and lowering a roof.

SUMMARY OF THE PRESENT INVENTION

The present invention is embodied within a trailer suited for use with a motor home for the transport of an automobile and, at a destination, serving as an auxiliary shelter for various purposes.

The present vehicle includes a wheel supported frame having a trailer body comprised of a front wall and side walls with a ramp structure constituting a rear wall. Located adjacent each corner of the trailer body is an electromechanical actuator coupled to a roof structure having a skirt thereabout for telescoping positioning adjacent the trailer front and side walls. The rear wall ramps are also partially enclosed by a rear skirt portion of the trailer roof structure. The rear wall ramps may be spring biased to facilitate raising and lowering by an individual. The interior of the trailer is provided with collapsible shelving for use when the trailer is not transporting a vehicle. A side door in the trailer side wall permits driver egress from an auto parked in the trailer and serves in the normal manner when the trailer is being used as a multipurpose, stationary structure. A door in the roof structure, upon being opened, permits the first mentioned door to be of normal height.

Important objectives include the provision of a dual purpose trailer having a positionable roof structure to permit towing with reduced drag and buffeting and, when parked, permits the trailer to have an interior size comparable to house trailers having fixed roofs; the provision of a trailer having a roof structure positioned by electromechanical actuators which are synchronized to prevent binding of the roof structure during roof positioning; the provision of a trailer having a rear wall structure which provides ramps positionable by an individual; the provision of a vehicle trailer equipped with a side door permitting automobile door opening and ingress and egress of a driver from an auto parked in the trailer; the provision of a vehicle trailer wherein a ramp structure additionally serves as a rear wall of the trailer and which brace the side walls against displacement.

BRIEF DESCRIPTION OF THE DRAWINGS

In the accompanying drawings:

FIG. 1 is a side elevational view of the present trailer;

FIG. 2 is a perspective view of a trailer front wall and a side wall with shelving shown deployed for a secondary use of the trailer;

FIG. 3 is a rear elevational view of the trailer taken from the right side of FIG. 1 with the roof structure elevated to the broken line position;

FIG. 4 is a horizontal sectional view taken along line 4—4 of FIG. 1;

FIG. 5 is a horizontal sectional view taken along line 5—5 of FIG. 3; and

FIG. 6 is a fragmentary elevational view of ramps and spring assist for same.

DETAILED DESCRIPTION OF PREFERRED EMBODIMENTS

With continuing attention to the drawings wherein applied reference numerals indicate parts similarly hereinafter identified, the reference numeral 1 indicates generally the present trailer in place behind a towing vehicle 2 such as a motor home.

The present trailer includes a tongue 3 equipped with a suitable coupling for two vehicle attachment. A frame 4 of the trailer supports a vehicle body 5 which is comprised of side walls at 6 and 7 joined by a front wall 8 and a floor at 9. A rear wall is comprised of a pair of ramps at 10 and 11 with each hingedly mounted as at 12 to a frame mounted pair of brackets 13. To facilitate safe and convenient lowering as well as raising each ramp 10 and 11 a spiral spring 15 is housed in a tube as at 14 on the ramp lower edge. The spring tends to counterbalance the weight of each ramp. A spring end 16 moves with the ramp and tube attached thereto while the unseen end of the spring is fixed to a support shaft 17. When both ramps ar in the upright position they constitute a rear wall of the trailer. For the sake of providing a rigid wall structure the ramps each have a rabbett outer edge at 10A-11A which engages the rearward upright edge of each of the side walls to reinforce the walls against swaying when under way. Additionally each ramp is equipped with a mortise dead bolt lock as at 18 in FIG. 5 with the lock throw 18A seating in a side wall recess.

A roof structure indicated generally at 20 and includes a top wall 21 with a depending skirt wall structure including side walls 22 and 23 and interconnecting front and rear walls 24 and 25. Accordingly the depending walls 22, 23, 24 and 25 constitute a perimeter wall which may overlie the fixed walls of the trailer in its lowermost position.

For purposes of positioning the roof structure 20 an electromechanical actuator 26 is positioned adjacent each corner of the trailer body with an extendable tube member affixed to the roof structure at 27A.

The electromechanical actuators at 26 ar secured at their base ends 28 to the trailer floor and are additionally secured to the trailer side walls by brackets as at 30. Such actuators include an electrical motor at 29 and limit switches to terminate extension and retraction of translating tubes 27. The actuators are in series with one another to assure synchronized lifting and lowering of the roof structure with the circuit energized by the towing vehicle's electrical system.

In the trailer body a side door 32 is hingedly carried by trailer side wall 6 and equipped with a lock at 33. A companion or upper door 34 is formed in wall 23 of the roof structure and, when opened, permits side door 32, of side wall height, to open and close in an unobstructed manner. Door 32, as shown in FIG. 4, permits the driver of an automobile A parked within the trailer to exit same on both doors 32 and 34 being opened. When the trailer is parked and the trailer interior to be used, for whatever purpose desired, the upper door 34 may be left in an open position a the primary door 32 fully closes the door opening in side wall 6.

In use the automobile to be transported is driven into the trailer with side door 32 open permitting the driver to exit the automobile and trailer. The trailer may be equipped with tie-down devices to assure securing of the automobile to the trailer floor. The ramps 10 and 11 are subsequently raised to the upright position and locked in place to the trailer side walls. The ramps, when raised, abut one another long their opposed edges 10B-11B while the rabbetted outer ramp edges 10A-11A engage the trailer side wall edges to provide a rigid rear wall structure of the trailer. Prior to travel, the roof structure 20 is lowered into place alongside the trailer side walls, front wall 8, and the rear wall structure embodied in the ramps 10 and 11. Actuation of the electromechanical actuators is from the trailer exterior as by a digital touchpad switch 31. At the destination site the roof structure is elevated and the rear ramps of the trailer lowered into ground contact. With the cargo removed from the trailer the trailer ramps 10 and 11 ar repositioned and locked in the upright position. The trailer may be utilized for various purposes as for example a hobby room or home workshop with the shelves at 37 deployed to the horizontal and supported thereat by the folding brackets at 38. Hinges a 39 attach the shelving to the wall interior surfaces.

Wall displacement or swaying when the trailer is moving is prevented by the internal wall structure and the two point attachment of each actuator 26 to the trailer floor and a side wall by a bracket 30.

While I have shown but one embodiment of the invention, it will be apparent to those skilled in the art that the invention may be embodied still otherwise without departing from the spirit and scope of the invention.

Having thus described the invention, what is claimed and desired to be secured by a Letters Patent is:

1. A multipurpose trailer for the transport of an auto and for user occupancy when parked, said trailer comprising,
   a wheel supported frame,
   a front wall and side walls on said frame,
   a roof structure having a skirt wall thereabout,
   electromechanical actuators in series with one another and each of said actuators coupled to said roof structure to position same,
   ramp means hingedly coupled to said frame and positionable to an upright position and thereat constituting a rear wall of the trailer,
   said vehicle body including collapsible fixtures, hinge means attaching said fixtures to said walls permitting horizontal deployment of the fixtures and oppositely collapsing of the fixtures,
   one of said side walls having a door therein providing an open area for the reception of the door of an auto to permit entry into and exiting from the auto, and
   said ramp means including a pair of ramps, locks locking each of said ramps to one each of said side walls.

2. A multipurpose trailer for transporting an automobile and for occupancy when parked, said trailer comprising,
   a wheel supported frame,
   a trailer body including a front wall and side walls on said frame,
   a roof structure including a skirt portion,
   electromechanical positioning means in said trailer body and coupled to said roof structure to raise and lower same,
   ramps hingedly mounted on said frame having an upright position to constitute a back wall of the vehicle,
   door means in one of said side walls and in said skirt portion of the roof structure, each of said ramps when in an upright position in engagement with one of said side walls, said ramps when raised to an upright position also being in edgewise abutment with one another to jointly support the side walls against lateral displacement.

* * * * *